PROCESS FOR MANUFACTURING REPRINTED MATTER (RELIEF PRINTING)

Filed Dec. 31, 1969 4 Sheets-Sheet 1

July 24, 1973 YOSHIHARU IISAKA ET AL 3,748,202

PROCESS FOR MANUFACTURING REPRINTED MATTER (RELIEF PRINTING)

Filed Dec. 31, 1969 4 Sheets-Sheet 2

PROCESS FOR MANUFACTURING REPRINTED MATTER (RELIEF PRINTING)

Filed Dec. 31, 1969 4 Sheets-Sheet 3

United States Patent Office 3,748,202

Patented July 24, 1973

3,748,202

PROCESS FOR MANUFACTURING REPRINTED MATTER (RELIEF PRINTING)

Yoshiharu Iisaka, Yasuo Katsurada, and Shigeo Suzuki, Tokyo-to, and Takatoshi Saijo, Kawasaki, Japan, assignors to Kyodo Insatsu Kabushiki Kaisha, Tokyo, Japan Filed Dec. 31, 1969, Ser. No. 889,369
Claims priority, application Japan, Apr. 19, 1969, 44/30,474
Int. Cl. B44c
U.S. Cl. 156—59 13 Claims

ABSTRACT OF THE DISCLOSURE

The present invention relates to a relief printing process for obtaining a perfect printed replica or reproduction of an original oil painting or the like without losing a bit of its unique quality or relish. The process comprises means for printing patterns in the uneveness such as projections and recesses of an original on a suitable base material to thereby prepare a pattern-duplicated structure, means for making a press mold having shaped therein the unevenness corresponding to said printed patterns directly from the original with an easily partable material without damaging said original, means for retaining a hardenable material on said pattern-duplicated structure or in the unevenness of said press mold so that the printing face of said pattern-duplicated sheet will have its printed patterns and unevenness combined integrally under hardened or unhardened condition, and means for stripping said press mold from the hardened material and forming a duplicate structure shaped with the unevenness corresponding to the printed patterns on the printed face of said pattern-duplicated structure.

BRIEF SUMMARY OF THE INVENTION

This invention relates to a relief printing process for producing a replica or replicas of an original work of art and craft such as, for example, an oil painting.

In the conventional practice for reproduction of a painting, the main stress has been laid on faithful duplication of the hues or coloration of the original painting, and it has not usually been possible to reproduce the fine and delicate unevenness representing, for example, the subtle brush touches by the original artists, so that the replica obtained would not reproduce the conformation of the surface. In order to produce three-dimensional effect, there has been employed a method for embossing the duplicate from backside thereof concurrently with printing operation by an embossing process, or a method for effecting "raising" by spraying specific resin powder and heating it after printing has been completed. The block used for this emboss printing has been prepared either from a directly manually engraved plate, or by first making an electrotype having formed therein recesses corresponding to the embossed portions, then aplying plaster thereto and hardening it, using the electrotype as male die and the plaster as female die, preparing such combination in plurality and assembling the combinations to compose a form. Unevenness on a printed surface may also be formed by press work using a die having the unevenness corresponding to the printed patterns. In this case, a prototype is pressed against a combination of a metal plate or the like and a rubber cloth to shape a form, then patterns are formed in conformity to the unevenness formed on the surface of said rubber cloth, thereafter the metal plate, etc., are stripped off to make a flat plane, then the patterns are printed on the metal plate or the like, and finally the prototype is pressed thereagainst from backside thereof to thereby simultaneously form the patterns and the unevenness.

Such embossing techniques, however, are found still unsatisfactory for true reproduction of the fine and delicate unevenness of the original work, and the produced replica can hardly give viewers a sense of "reality," but rather gives, at one glance, an impression that it is an imitation work. An effort toward overcoming such imperfection is attempted in Japanese Pat. No. 501,170 which proposes an improved method in which a pattern or patterns desired for forming desired projections or unevenness are printed on a printing paper while the desired unevenness conforming to the printed patterns is formed on one face of a metal mold, then an adhesive is applied on the flat surface of a mount, and on this adhesive layer is placed the printed face of said printed paper with a transparent thermoplastic film layer or a resin coating layer being applied thereon, then the uneven face of said metal mold is registered with the printed pattern and placed on said transparent layer, and the thus laminated assembly is subjected to heating and pressing treatment by a press, thereby to effect simultaneous unevenness shaping operation of the flat surface portion of the amount along with said interposing layer, printed paper and adhesive layer by the uneven metal mold from only one side. This improved method also requires high technical skill for forming the unevenness resembling that of the original work since, in this method, in order to present subtle "feeling" of oil painting, such unevenness is formed in a press mold. Further, in case of forming a model directly from the original painting, the latter is also subjected to heating and pressing process and, in some cases, it may be additionally brought in contact with chemicals during such treatment, so that there is a large possibility of damaging the original painting and therefore, this method cannot be used for a highly precious work for such reason. Also, if the unevenness shaped in the press mold fails to have close resemblance to that of the original painting, the resulting relief printing could produce extremely unnatural representation. Moreover, it was impossible with this method to satisfactorily shape the sharply raised unevenness such as strong brush touch in an oil painting, and it also required heating and pressing treatment by a press for shaping of the unevenness, so that this method could not be practiced at a print shop where such kind of equipments are not installed, hence the inevitable inconvenience, lack of economy and high cost of relief printings.

The present invention is, therefore, intended to effectively eliminate these defects inherent to the conventional devices and to provide a novel method which permits amazingly accurate and faithful reproduction of a work of art and craft such as paintings having fine and delicate unevenness on the surface.

The present invention is also designed to allow mass-production, at low cost, of realistic duplicate pictures which express not only the patterns of the original drawings but also the fine unevenness representing the fine brush touches by an artist or painter.

Another object of the present invention is to obtain even better reproduction by constituting a press mold which has shaped therein the faithfully traced unevenness of the original painting by making a mold directly from the original and printing on a printing paper the patterns from said original so as to coincide with the unevenness traced in said press mold.

It is still another object of the present invention to provide a reproducing method whereby, when direct modelling is effected from a work of art or craft such as paintings which are unique, there is no need of taking steps to subject the original to heating and pressing treatment or to apply a chemical thereon, thus keeping the original work safe from damage or injury which may otherwise be caused by such treatment.

It is yet another object of the present invention to make suitable for mass-production a relief printing process whereby replicas precisely reproducing not only the patterns of the oriignal but also the fine and delicate unevenness and having a three-dimensional realistic feeling can be obtained with high precision and ease.

It is also an object of the present invention to provide a relief printing process in which there is no possibility of causing unnatural tracing of the unevenness due to presence of air bubbles or other alient substances at the interface between the unevenness shaping members and the press mold, thus allowing precise facsimilation of the sharply raised unevenness.

With the above-mentioned objects in view, the present invention contemplates a unique relief printing process according to which, when, for example, an illustrious work of art such as an oil painting which is extremely difficult of access is to be reproduced, first the pattern of the particular painting to be reproduced is printed or copied on a printing paper or other base material such as a canvas used for painting from a color film in which said oil painting was photographed, then on said pattern on said base material is formed the unevenness corresponding to that in the original in the same manner as depicting the original painting following the traces expressed in the pattern printed or copied on said base material, thereby to constitute a prototype, thereafter direct modelling of the unevenness shaped in said prototype is conducted without breaking or deforming said unevenness to thereby prepare a press mold, and then the unevenness formed in said press mold gives shape in conformity to said painting to the pattern printed on the printing paper.

One of the important features of the present invention is that silicone rubber or other similar material which is hardened and easily partable at normal temperature is used as the material for making a mold directly from the original so that when applied on the uneven face of an original painting, it won't damage said original painting and that the hardened coating film shaped with the unevenness of the original won't produce deviation from the printed pattern due to elongation or deformation, and by using the thereby prepared press mold, true replica of the original is produced. A pattern corresponding to the unevenness shaped in said mold is printed on the base material, then the coating layer made of synthetic resin hardened at normal temperature is disposed on the printed face of said base material, and before this coating layer is hardened, said pressure mold is placed on the layer surface in such a manner that the unevenness thereof will coincide with the printed pattern of the base material, thereafter pressure is applied from above said mold to shape the unevenness, and finally, after said coating layer has hardened, said mold is stripped off.

Another important feature of the present invention comprises the steps of printing on the base material a pattern to be molded, preparing a press mold made of non-elastic material shaped with the unevenness corresponding to the printed pattern, filling in the recesses in said mold a hardenable fluid material made of synthetic resin to shape the unevenness, and after or before hardening thereof, joining integrally on the surface thereof the printed face of said base material, with the printed pattern and the unevenness being joined together in proper registry with or without an adhesive, forming and retaining on the printed face of said material a hardened synthetic resin layer shaped with the uneven pattern corresponding to the printed pattern, and then removing the mold.

According to the present invention, the unevenness shaped in the hardened synthetic resin layer in correspondence to the printed pattern on the base material is formed true to the unevenness in the mold on the printing face of said base material, so that the resulting duplicate has the same three dimensional effect as the original.

Particularly, in case the present invention is used for a painting having high value, the original painting remains perfectly safe from damage since it is not subjected to heating or chemical treatment, and faithful representation of the unevenness is obtained.

Also, according to the method of the present invention, the reproduced unevenness shaping layer is not changed from the original but the form thereof is retained by using a non-elastic material, keeping the shaped unevenness safe from elongation or deformation, so that the printed patterns reproduced from the original can be arranged in precise registry, thus positively eliminating non realistic appearance produced in prints obtained by the conventional relief printing processes. Also, after the mold has been removed from a replica, there is produced no relapse or deformation of the unevenness shaped in the hardened synthetic resin layer and also air bubbles or other extraneous substances are kept away from the interface between the mold and the synthetic resin layer. Further, not only the sharp unevenness but also the fine and delicate unevenness ranging from the brush touches in the original to the weave of the canvas can be precisely reproduced.

The present invention allows realistic duplication of the original on a mass-production scale and at low cost simply by pressing from one side the mold in which the unevenness in the original is faithfully impressed. The "original" which may be reproduced by the present invention is not limited to oil painting; it includes reptile skins such as those of snake or alligator, fabric texture, grain and so forth. Those materials can be directly modelled to prepare a press mold without damaging the original. Also, instead of a flat mount, a leather, plywood or metal plate may be used as base material, and as desired, the pattern of the original may be back-printed on a plastic film or sheet and pasted on said base material, whereby imitation leather, ornamental plate, style strip and the like may be easily produced.

The present invention is also featured by simplicity of construction and manufacture thereof. For example, the fine unevenness can be shaped without using a press, so that the operation can be carried out with ease even in a printing shop where no such type of equipments are installed. Thus, according to the present invention, manufacturing cost is reduced and also, since the material to be printed is integrated concurrently with shaping operation, the producing process is shortened and simplified, so that the present device is suited for mass-production.

Now, some preferred embodiments of the present invention will be described in detail with reference to the accompanying drawings, in which.

Figure 1:
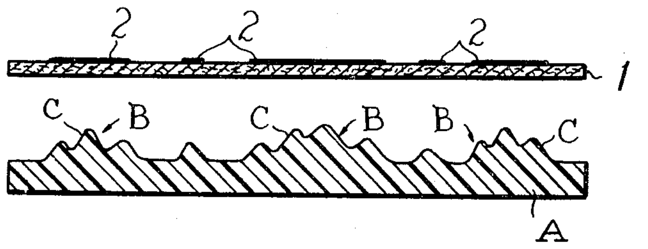
FIGS. 1 to 5 are sectional side views showing the production steps.
Figure 2:
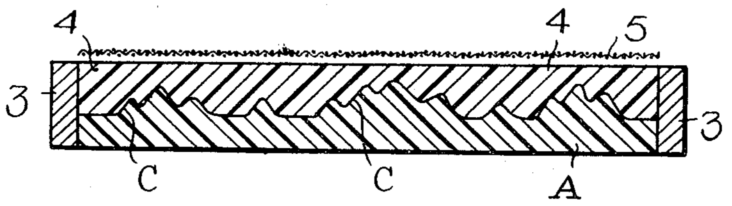

Referring first to FIGS. 1 to 6, the patterns B of an original oil painting A to be reproduced are photographed by color-separation photography, and form the obtained separation negative, the patterns B are duplicated in the original size on a printing paper 1 by printing means, and the printed patterns 2 are retained on the paper 1, as shown in FIG. 1. Duplication of these patterns may be achieved by first making plate and print by a conventional method from a separation negative obtained by color-separation photographing the patterns from the original painting or from a color film in which said original is photographed, and then duplicating said print on a base material. The patterns 2 of, for example, grain or the like may be retained on the paper sheet 1 by printing or photographic means. Since the mold, when prepared as described above has the dimension of the painting or other irregular material to be reproduced, the photograph must also be to scale so that the photograph and the three-dimensional transparent replica made from the mold can be placed in exact registry.

Figure 3:
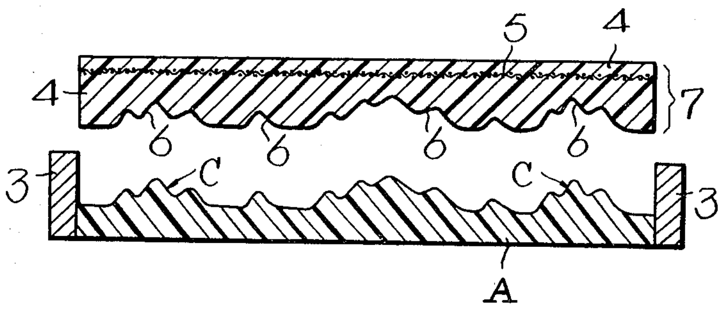
Figure 4:
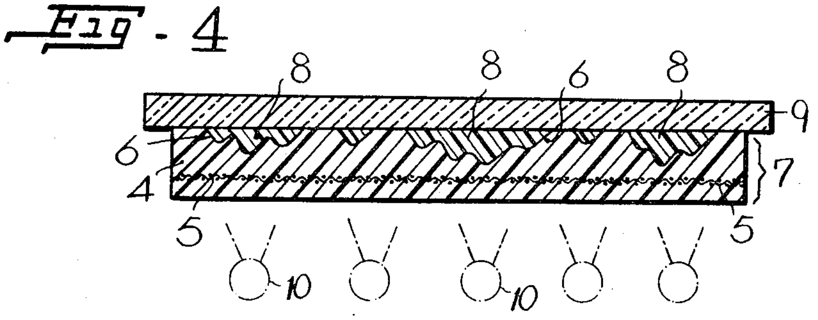

For manufacture of a press mold, first a fluid material is prepared by adding a desired hardening agent to silicone rubber which is hardenable at normal temperature and then blending therein an assisting agent necessary for adjusting hardness, viscosity and fluidity. The original painting A to be reproduced is placed flat such that its face having the unevenness C faces upward, and if necessary, the original A may be enclosed with a suitable frame 3. Then, the above-said previously prepared fluid material is poured, while in unhardened state, on the uneven or rugged face C and extended uniformly to form a shaping layer 4. While said shaping layer 4 is in unhardened state, a non-elastic film or sheet such as a fabric 5 made of glass fibers is pasted in contact on said layer 4 (FIG. 2), and then after removing air bubbles and hardening the layer 4 at normal temperature, said layer is parted from the original A, thereby forming a press mold 7 having the unevenness 6 shaped by the corresponding unevenness C of the original A and retained in shape by the non-elastic material 5 (FIG. 3). This press mold is made of transparent or semi-transparent light-permeable material, and also the non-elastic material is made of light-permeable material, so as to make the press mold 7 light-permeable.

Then, this press mold 7 is placed flat with its rough face 6 upward, and thereafter fluid-sensitive synthetic resin 8 which is hardened by the acton of light is poured on said rugged face and spread out uniformly. Then, a doctor or squeeze roller is applied thereupon to expel any air bubbles in the light-sensitive synthetic resin 8 as well as excessive resin, and thereupon is covered with a smooth and light-impermeable plate such as an opaque glass plate 9 to shut off light and air. Light is applied to the light-sensitive synthetic resin 8 filled in the uneven portions 6 of said light-permeable press mold 7 through said mold 7 thereby to harden said resin.

Figure 5:
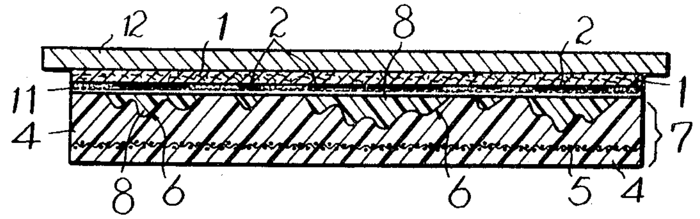
Figure 6:
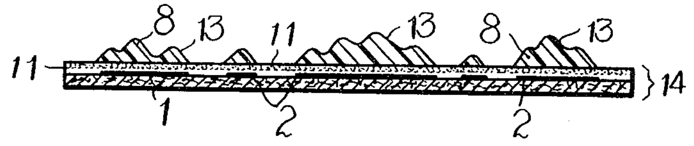
FIG. 6 is a sectional side view of a duplicated structure.

In this embodiment, light application was effected for about 5 to 7 minutes by using light sources 10 each comprising an ultraviolet lamp (60 w. diazo fluorescent lamp) from a distance of 10 cm. when the largest thickness of said light-sensitive resin layer 8 was 1.4 mm., and thereby sufficient hardening was achieved. (See FIG. 4.) On the upper face of the hardened light-sensitive resin layer 8 is placed the printed paper 1 in such a manner that the patterns 2 thereof and the shaped unevenness 6 correspond to each other with a transparent or translucent adhesive layer 11 being interposed therebetween, and if need be, a flat plate 12 may also be placed thereon, and then pressure is applied to this assembly to bond the members together into an integral structure (FIG. 5). Thereafter, the assembly is removed from the press mold 7, whereby obtained is a print or duplicated article 14 where the hardened light-sensitive resin layer 8 having the unevenness 13 corresponding to the patterns 2 and having identical contour with the unevenness C in the original painting A is integrally formed on the printed pattern 2 face of the printed paper 1 through the adhesive layer 11 therebetween (FIG. 6).

The press mold 7 may be formed with non-transparent silicone rubber which is hardened at normal temperature and the light-sensitive resin layer 8 formed on the rugged face 6 may be covered with a transparent or partly transparent glass pane, and the light of ultraviolet lamps may be applied from above thereof to thereby effect hardening of the resin layer 8. In order to achieve desired hardening of the light-sensitive resin used in this embodiment, it is required, beside subjecting it to the action of light, to keep it uncontacted with air and to intercept light on the opposite side of the light source.

In the embodiment shown in FIGS. 7 to 10, reproduction of the patterns is achieved by printing a reproduction of an original oil painting on a printing paper sheet 1 by a known method from a separation negative obtained by color-separation photographing of the pattern B from a color film on which the original is photographed, and on the printing face of one of said printed paper sheets 1 is formed the unevenness 16 corresponding to that of the original following the traces expressed by the patterns 2, by using a material prepared by adding a suitable additive to a transparent medium of oils to adjust viscosity, plasticity and hardness, and thereby forming a prototype 15.

Figure 7:
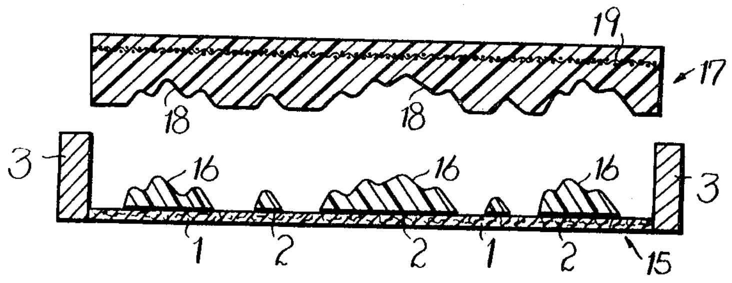
FIGS. 7 to 10 are sectional side views showing the production steps in another embodiment of the present invention.
Figure 8:
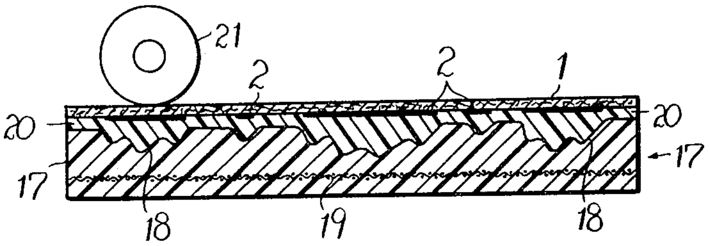

By using the same means as described with respect to the first embodiment, a press mold 17 shaped with said unevenness 16 is formed on the prototype 15. This press mold 17 is supported by a non-elastic member 19 and has the unevenness 18 corresponding to the patterns 2 printed on the sheet 1 (FIG. 7).

Figure 9:
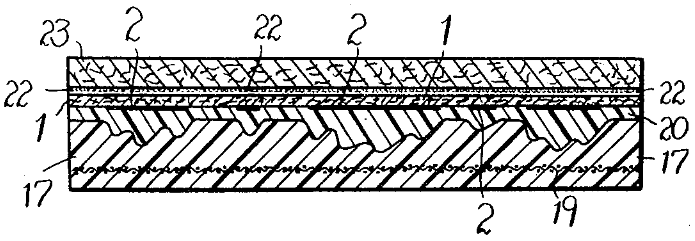

Said press mold 17 is placed flat with its rough face 18 facing upward, and then transparent synthetic resin which is hardened at normal temperature, such as for example polyester resin blended with a hardening agent and an initiator, is poured onto said rough face and spread evenly to fill up the recesses in the mold 17, thus forming a coating layer 20. Before this coating layer 20 is hardened, one of said printing paper sheets 1 is placed on said layer 20 such that the patterns 2 and the unevenness 18 are aligned with each other, and then a roller 21 is pressingly rolled thereon to squeeze out air bubbles as well as excessive polyester resin. Thereafter, a flat cardboard 23, which is a support applied with an adhesive 22, is placed on the backside of said paper sheet 1 through said adhesive 22 and integrally pasted thereto to keep off the air, and under this condition said coating layer 30 is hardened (FIG. 9).

Figure 10:
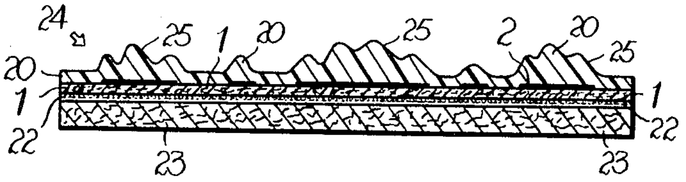

Upon removal of the assembly from the press mold 17, there is obtained a printed article 24 where the transparent hardened polyester resin layer having the unevenness coinciding with the patterns 2 and having the same contour as the unevenness 16 corresponding to that of the brush touches in the original painting is integrally formed on the printing face of said printing sheets 1 supported on a flat cardboard 23 through an adhesive (FIG. 10).

Figure 11:
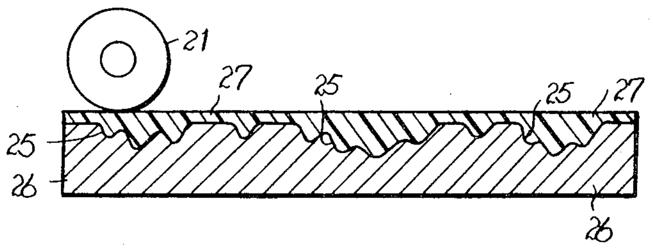
FIGS. 11 to 13 are sectional side views showing the production steps in still another embodiment of the present invention.
Figure 12:
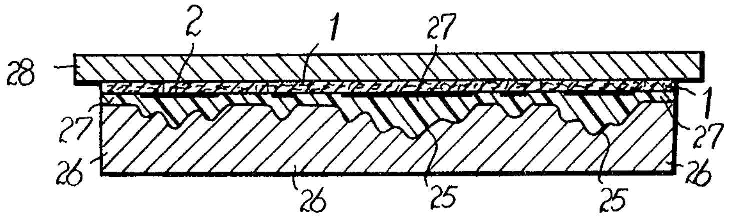
Figure 13:
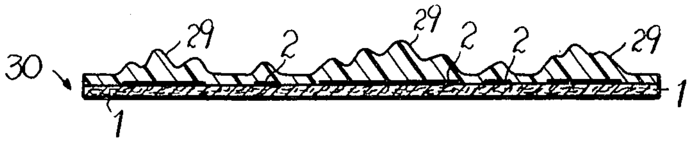

In the embodiment shown in FIGS. 11 to 13, different means from those in the preceding embodiments are used for preparation of the press mold and for shaping operation. Reproduction of the patterns is effected in the same manner as in the preceding examples by using printed paper sheets 1 having the patterns 2, forming on the printing face of one of said sheets the unevenness corresponding to that in the original to thereby form a prototype, and preparing from this prototype a metal mold 26 formed with the unevenness 25 according to a known electrotype method.

Then, the prepared metal mold 26 is placed flat with its rugged face 25 facing upward, and thereon is poured a fluid material composed of synthetic resin which is hardened upon heating, such as transparent vinyl chloride plastisol, said material being spread evenly to fill up the recessed portions. A roller 21 is pressingly rolled thereon to remove air bubbles and excessive vinyl chloride plastisol, and then a coating layer 27 is provided, which is subjected to heating treatment at about 180 to 200° C. for about 10 minutes to harden (gelate) it. After said hardened coating layer 27 has been cooled to about 120° C., said printed paper sheet 1 is placed on the surface thereof such that the patterns 2 will coincide with the unevenness 25 and then a reinforcing plate 28 is mounted thereon, the whole assembly being then pressed and bonded up integrally and cooled to normal temperature. Thereafter, the reinforcing plate 28 is removed and the molding is separated from the metal mold 26, whereby there is obtained a printed article 30 where the transparent vinyl chloride resin layer 27 having the unevenness 29 corresponding to the patterns 2 and having the perfectly same configuration as that in the original is integrally formed on the printed face of the sheet 1 (FIG. 13).

Instead of the cardboard 23 used in the shown embodiment, a plate of synthetic resin such as vinyl chloride resin, a metal plate, a wooden plate or other suitable support may also be used, and such supporting member may be pasted to the printing paper sheet 1 to serve as base material. As base material used for reproduction of the patterns 2, there may be used, instead of said printing paper 1 or a combination thereof with a support, a structure using said support as base material with the patterns being directly printed thereon. Also, as the material for forming the unevenness on the printed face of said base material, said polyester resin may be substituted with a type which is hardened by producing a cross-linking reaction upon being added with a hardening agent such as epoxy resin or also, vinyl chloride acrylic resin or other powdery resin may substitute for plastisol. Such resin, upon heating, melts and becomes sufficiently fluid so that it can fill up the recessed portions in the press mold and form a coating layer. In any event, there is used a material which is hardened upon heating.

During this heating and hardening process of such fluid or powdery resin, if there is involved any possibility of impairing printing ink of the patterns, it is advisable to paste the coating layer, after having been hardened, to the base material on which the patterns are printed, and if need be, an adhesive may also be applied. In this case, the adhesive used should suitably be selected according to the type of the hardened coating layer and the properties of the base material.

The press mold used for practicing the present invention can be prepared in any desired number by reproduction of the press mold obtained in each of the described embodiments by using thermoplastic or heat setting synthetic resin, metal of other material according to a known method. In case the press mold is made of flexible material, the base material may be formed with hard material, while if the press mold is composed with hard material, it is then preferred to form the base material with flexible material, thereby to facilitate separation of the press mold.

The term "hardening" as used in the description of the present invention means that the fluid material is solidified to a hardness sufficient to stand use as a printed article, and does not necessarily mean that it becomes "hard and brittle," or in other words, the "hardened" material still holds some flexibility. The "color-separation photography" also appearing in the specification means not only the system for separating the three primary colors, but also other color separating systems such as the one in which texture color of for example a grain and pattern color are separated. It is also possible to obtain unusual relief prints by suitably combining the described press mold preparing processes, the pattern reproducing steps and the shaping means.

What is claimed is:

1. A relief printing process suitable for reproducing in mass-production the color and surface irregularities of subject matter including art works, crafts and oil paintings, comprising the steps of applying a hardenable material to the irregular face of said subject matter, said material being selected to be non-reactive with said face and to be dimensionally stable and easily partable from said face when hardened, causing said hardenable material to harden in contact with said subject matter, stripping said hardened material from said subject matter, thereby forming a mold for the production of replicas of said irregular surface of said subject matter, preparing a color reproduction of said subject matter substantially equal in scale thereto, placing in said mold a hardenable transparent resin, hardening said resin to form a replica of the irregular surface of said subject matter, said replica having one flat face, and joining said flat face of said replica to said reproduction so that the irregularities in said replica are in registry with said color reproduction as in said subject matter.

2. The process as defined in claim 1, wherein said hardenable material is a silicone resin.

3. The process as defined in claim 1, wherein a non-elastic material in essentially sheet-like form is embedded in said hardenable material prior to hardening for the purpose of increasing the dimensional stability of said mold.

4. The process as defined in claim 3, wherein said non-elastic sheet is of glass fiber.

5. The process as defined in claim 1, wherein said hardenable material is hardenable near room temperature.

6. The process as defined in claim 1, wherein said hardenable resin is hardenable by and is hardened by light.

7. The process as defined in claim 1, wherein said color reproduction is printed on a substrate similar to that of said subject matter.

8. The process as defined in claim 1, further comprising the step of joining the flat face of said replica in registry to a reproduction of the object or painting to be reproduced and using a roller for removing air bubbles from therebetween.

9. The process as defined in claim 1, wherein said replicas are made from a resin selected from the group consisting of polyesters, vinyl chloride, or acrylics.

10. The process as defined in claim 1, wherein said hardenable resin containing an initiator constituting said replicas is applied to said mold as a powder, is heated to convert it to a liquid and then cooled to harden same.

11. The process as defined in claim 1, wherein said mold is made of a thermosetting material.

12. The process as defined in claim 1, wherein at least one of said mold and said replica is hardened through incorporation of an initiator in at least one of same.

13. The process as defined in claim 1, wherein at least one of said mold and said replica is sufficiently flexible to facilitate the separation of one from the other at the conclusion of the step of forming said replica.

References Cited

UNITED STATES PATENTS

| | | | |
|---|---|---|---|
| 2,050,595 | 8/1936 | Wolfe | 204—159.14 X |
| 2,379,218 | 6/1945 | Dial et al. | 264—22 X |
| 3,345,939 | 10/1967 | Jemseby | 101—211 |
| 1,350,365 | 8/1920 | Fuelling | 101—211 X |
| 2,390,618 | 12/1945 | Roehm | 101—211 X |
| 576,640 | 2/1897 | Weimann | 156—59 |
| 1,376,653 | 5/1921 | Steedman | 156—277 X |
| 3,190,947 | 6/1965 | Norcross | 264—225 X |
| 3,456,586 | 7/1969 | Andrus | 264—225 X |

FOREIGN PATENTS

| | | | |
|---|---|---|---|
| 52,657 | 3/1912 | Austria | 156—59 |

DAVID KLEIN, Primary Examiner

U.S. Cl. X.R.

101—211; 264—225, 132